Figure 1:
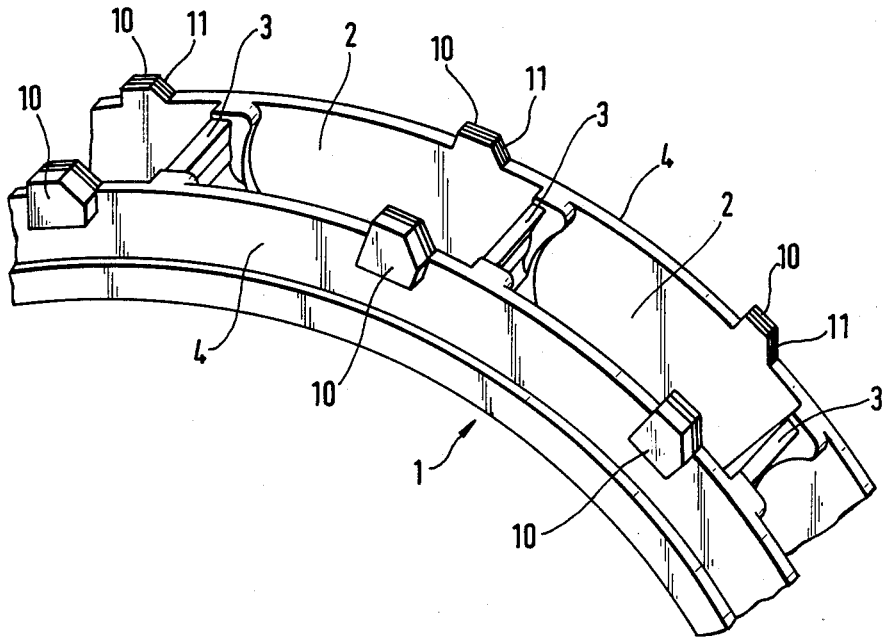

United States Patent [19]

Neuwirth et al.

[11] Patent Number: 4,986,402
[45] Date of Patent: Jan. 22, 1991

[54] CAGE FOR OVERRUNNING CLUTCH

[75] Inventors: Ernst Neuwirth, Herzogenaurach; Jürgen Rabe, Aurachtal; Joachim Ritter, Herzogenaurach, all of Fed. Rep. of Germany

[73] Assignee: INA Walzlager Schaeffler KG, Fed. Rep. of Germany

[21] Appl. No.: 57,342

[22] Filed: Jun. 2, 1987

[30] Foreign Application Priority Data

Jun. 20, 1986 [DE] Fed. Rep. of Germany ....... 3620804

[51] Int. Cl.$^5$ .................. F16D 15/00; F16D 41/07
[52] U.S. Cl. .................................. 192/45; 192/41 A; 192/45.1
[58] Field of Search ............. 192/41 A, 45, 45.1; 384/527, 576, 557, 905

[56] References Cited

U.S. PATENT DOCUMENTS

| 2,793,729 | 5/1957 | Cobb | 192/45.1 |
|---|---|---|---|
| 2,812,839 | 11/1957 | Cobb | 192/45.1 |
| 3,194,369 | 7/1965 | Witte | 192/41 A X |
| 3,324,980 | 6/1967 | Rojic et al. | 192/45.1 |
| 4,185,724 | 1/1980 | Kitchin | 192/45 |
| 4,187,937 | 2/1980 | Kitchin | 192/45 |
| 4,679,676 | 7/1987 | King et al. | 192/45 |
| 4,736,827 | 4/1988 | Kinoshita | 192/45.1 X |

FOREIGN PATENT DOCUMENTS

| 2136650 | 2/1973 | Fed. Rep. of Germany . | |
|---|---|---|---|
| 2655276 | 7/1977 | Fed. Rep. of Germany | 384/527 |
| 170791 | 9/1965 | U.S.S.R. | 384/527 |
| 796511 | 1/1981 | U.S.S.R. | 384/527 |

Primary Examiner—Rodney H. Bonck
Attorney, Agent, or Firm—Bierman and Muserlian

[57] ABSTRACT

A cage for an overrunning clutch with a metallic outer race accommodating concentrically a metallic inner element and having in a cage arranged between the outer race and the inner element camming elements retained under the action of springs in camming contact with the surfaces of the outer race, on the one hand, and of the inner element, on the other hand, the cage being made of injection moldable or castable polymeric material and having pockets for the camming elements defined by crossbars and at least one end ring connected therewith, at least one circumferential surface of the cage cooperating in the form of a sliding bearing with a cylindrical surface of the adjacent structural part (outer race and/or inner element), characterized in that the cage (1,15,22,30,39) is provided at least in the area of the end ring (4,18,23,33,45) with an annular metallic reinforcement shield (13,19,20,26,27,34,35,47) connected to the cage (1,15,22,30,39) in a form-fitting manner especially through injection-molding around the shield and whose temperature expansion coefficient corresponds essentially to that of the outer race (5,40) and the inner element (9,41).

11 Claims, 6 Drawing Sheets

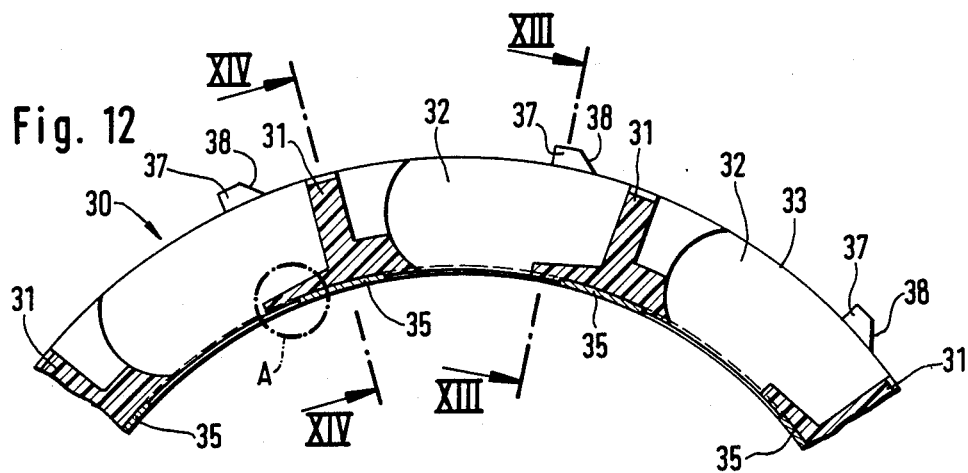
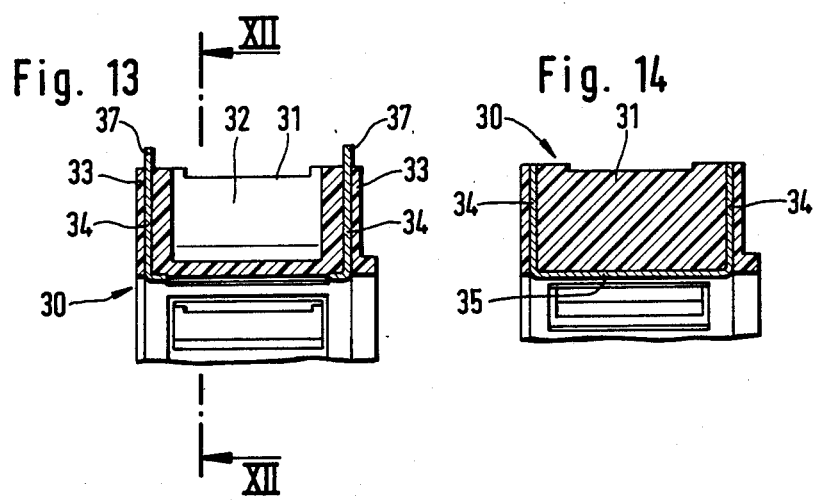
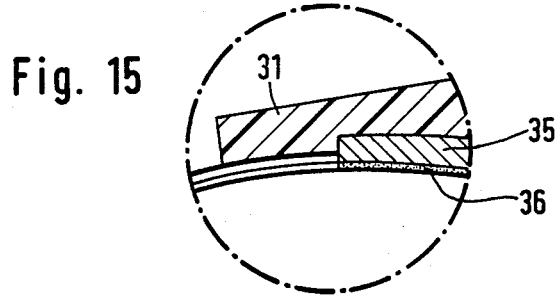

CAGE FOR OVERRUNNING CLUTCH

STATE OF THE ART

Cages for an overrunning clutch with a metallic outer race accommodating concentrically a metallic inner element and having camming elements arranged in a cage between the outer race and the inner element and retained under the action of springs in camming contact with the surfaces of the outer race, on the one hand, and of the inner element, on the other hand, the said cage being made of injection moldable and castable polymeric material and having pockets for the camming elements which are defined by crossbars and at least one end ring connected therewith wherein at least one circumferential surface of the cage cooperates in the form of a sliding bearing with a cylindrical surface of the adjacent structural part (outer race and/or inner element) are known from DE-OS 2,136,650.

The said cage shows, however, problems when used under operational conditions with operating temperatures fluctuating over an extremely wide range, e.g. from −40° C. to +150° C. It has been found that apart from problems due to the different temperature expansion coefficient between the metallic material of the inner element, on the one hand, and the polymeric material of the cage, on the other, could be expected with respect to the bearing clearance between both parts, a further problem has been encountered which due to the fact that after subjecting the cage initially to increased operating temperatures, permanent shrinkage occurs leading to a tight fit between the inner element and the bore of the cage and to an unacceptable play between the outer circumference of the cage and the outer race.

As far as the centering of the cage within the outer race is concerned, this shrinkage phenomenon can be overcome only insufficiently because it occurs at a magnitude which does not allow a compensation by respective dimensional corrections of the cage. To guarantee a prevention of an undesired play between the outer circumference of the cage and the bore of the outer race during operation, the cage would have to be manufactured with such an enlarged outer diameter that an insertion into the outer race becomes impossible.

OBJECTS OF THE INVENTION

It is an object of the invention to provide a cage of the above mentioned type for extremely fluctuating operating temperatures wherein the cage accurately retains its dimension relative to the adjacent structural parts (outer race and inner part) regardless of the respectively prevailing operating temperature and maintains especially in cooperation with the one structural part with which it forms a sliding bearing a bearing gap of constant width.

This and other objects of the invention will become obvious from the following detailed description.

THE INVENTION

The novel cage of the invention for an overrunning clutch with a metallic outer race accommodating concentrically a metallic inner element and having in a cage arranged between the outer race and the inner element camming elements retained under the action of springs in camming contact with the surfaces of the outer race, on the one hand, and of the inner element, on the other hand, the said cage being made of injection moldable or castable polymeric material and having pockets for the camming elements defined by crossbars and at least one end ring connected therewith, at least one circumferential surface of the cage cooperating in the form of a sliding bearing with a cylindrical surface of the adjacent structural part (outer race and/or inner element), is characterized in that the cage (1,15,22,30,39) is provided at least in the area of the end ring (4,18,23,33,45) with an annular metallic reinforcement shield (13,19,20,26,27,34,35,47) connected to the cage (1,15,22,30,39) in a form-fitting manner especially through injection-molding around said shield and whose temperature expansion coefficient corresponds essentially to that of the outer race (5,40) and the inner element (9,41).

By providing the cage at least in the area of the end ring with an annular metallic shield which is connected to the cage in a form-fitting manner especially through injection-molding and whose temperature expansion coefficient corresponds essentially to the one of the outer race and of the inner element, the metallic shield whose temperature expansion coefficient corresponds essentially to the one of the outer race and of the inner element forces upon the cage a temperature expansion behavior which corresponds to that of the outer race and of the inner element whereby during operation an unobjectionable centering of the cage within the outer race and a constant bearing clearance between the bore of the cage and the inner element is always guaranteed.

This cage is usable for overrunning clutch with cam rollers as well as the overrunning clutch with cam elements. In the first instance, the cage accommodates cylindrical cam rollers which cooperate with camming ramps in the bore of the outer race and with the cylindrical surface of the inner element. In the latter case, the cage accommodates non-circular cam elements which cooperate with the cylindrical bore of the outer race and with the cylindrical surface of the inner element.

According to a modification of the invention, the metallic shield is defined by a disc-shaped sheet metal element which according to one embodiment of the invention has a radial extension corresponding essentially to that of the end ring. The considerable stiffness of such a designed sheet metal element in the radial direction guarantees that the cage follows in its temperature expansion behavior that of the metallic shield and counters the shrinkage action. Sometimes, it is sufficient with regard to the stiffness of the shield to define the latter according to one embodiment of the invention by a sleeve-shaped sheet metal element arranged in the area of the end ring and according to a modification of the invention, snapped into corresponding recess in the bore of the cage.

To guarantee that the cage follows the temperature expansion behavior of the metallic shield also in the area of the crossbars in a required manner, according to a modification of the invention, the annular shield is suitably provided with essentially axially directed projections which extend within the crossbars.

Usually, those areas of the bore of the cage which are in engagement with the inner element are made of polymeric material because of its favorable sliding and wear characteristics. The characteristics of the sliding bearing defined by the bore of the cage and the inner element can even be improved in a modification of the invention by providing the cage in the area of the crossbars with radially inwardly projecting segments of polymeric material whose radially inwardly facing surfaces define a multi-surface sliding bearing for the inner element.

The bearing clearance prevailing between the bore of the cage and the inner element can be made completely independent of the temperature expansion behavior of the polymeric material when, according to an embodiment of the invention, in the area of the bore of the cage, the sheet metal element projects radially inwardly by at least a portion of its thickness relative to the polymeric material wherein in view of the possibly negative sliding and wear behavior of the metallic material of the inner element and of the sheet metal element, the bore wall surface of the latter can be provided with a layer of sliding bearing material.

Moreover, the accuracy of centering the cage within the outer race can be made independent of the temperature expansion behavior of the polymeric material when the metallic shield extends to the outer surface of the cage while being free from polymeric material at its outer circumference and the cage is centered in the outer race by the outer circumference of the metallic shield. This measure results, in addition to the advantage that during the transfer of radial forces introduced into the wall of the bore of the cage to the bore of the outer race, deformation of the cage is prevented at its outer periphery which otherwise could negatively influence the centering of the cage within the outer race.

In case the cage is provided with at least one radially outwardly directed projection which engages a corresponding recess of the outer race for providing a security against rotation, the metallic shield extends according to one embodiment of the invention into the projection and is free of polymeric material at the contact surface of the projection with the recess so that wear is eliminated in this area. In a final embodiment of the invention, the projection is defined by ar extension of the metallic shield.

Figure 2:
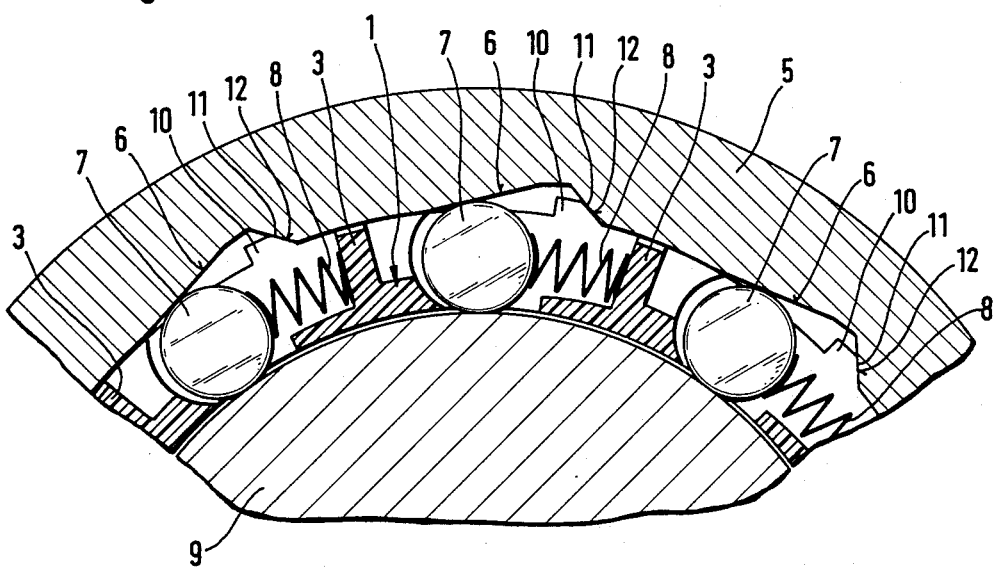
Figure 3:
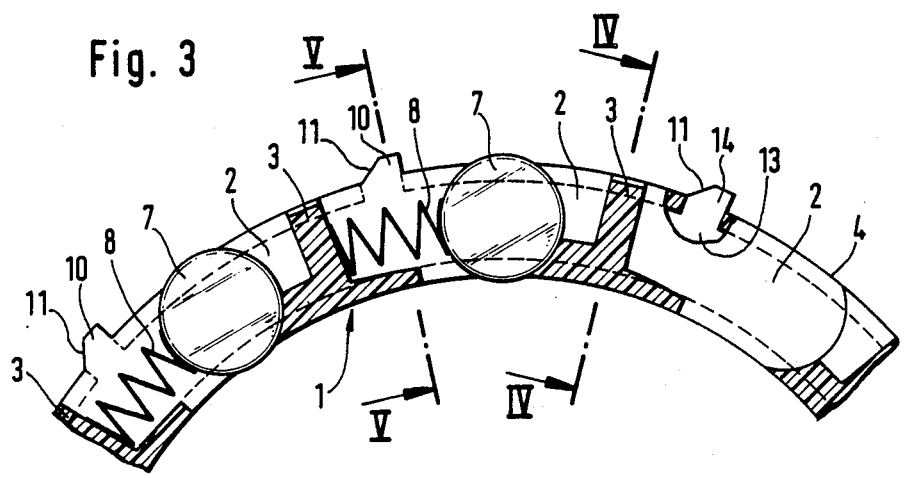
Figure 4:
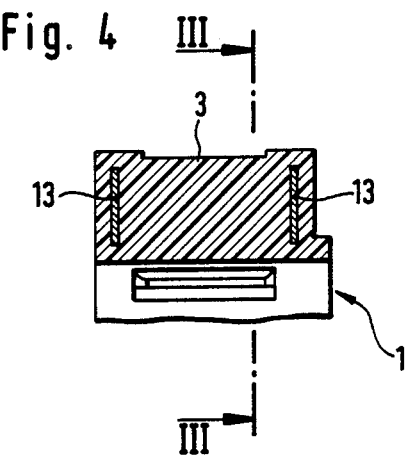
Figure 5:
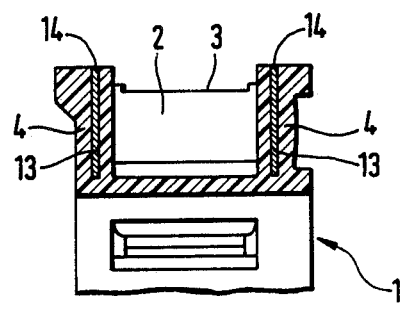
Figure 6:
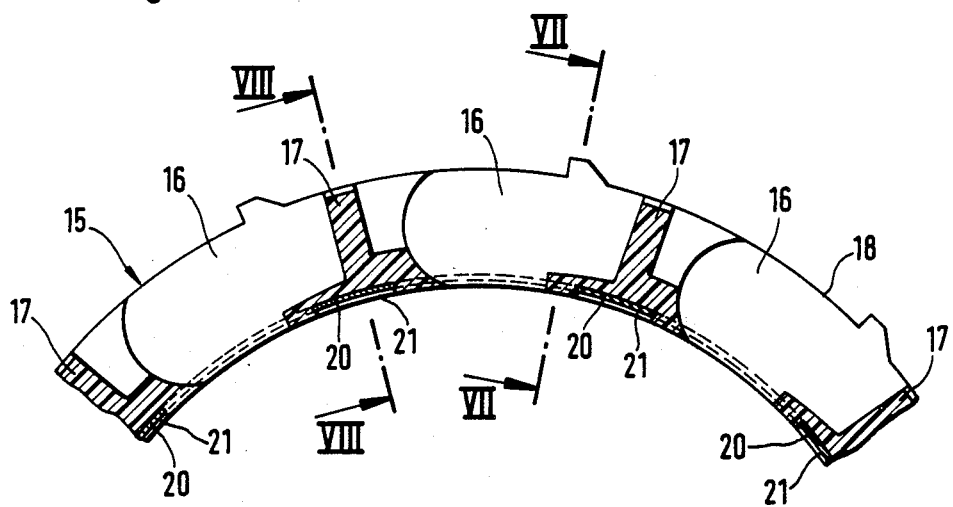
Figure 7:
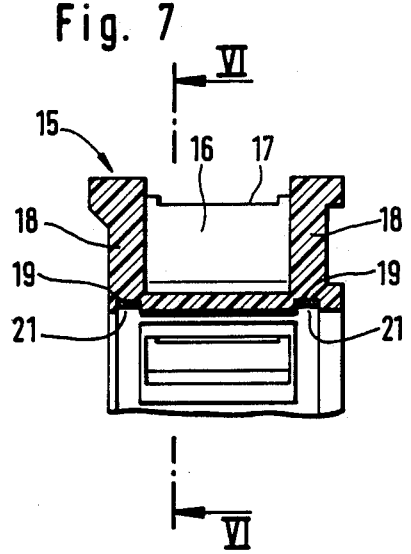
Figure 8:
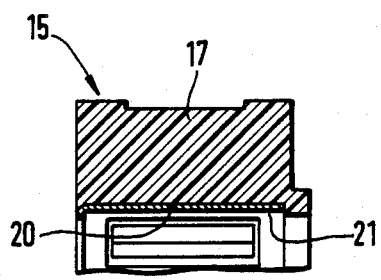
Figure 9:
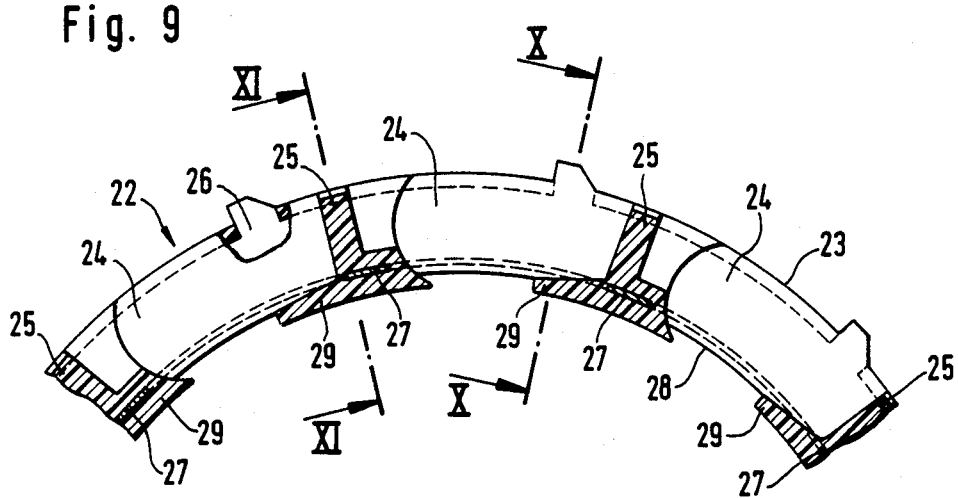
Figure 10:
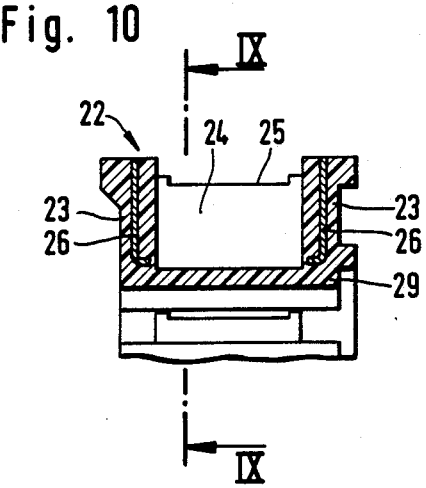
Figure 11:
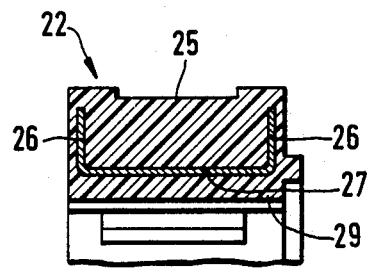
Figure 16:
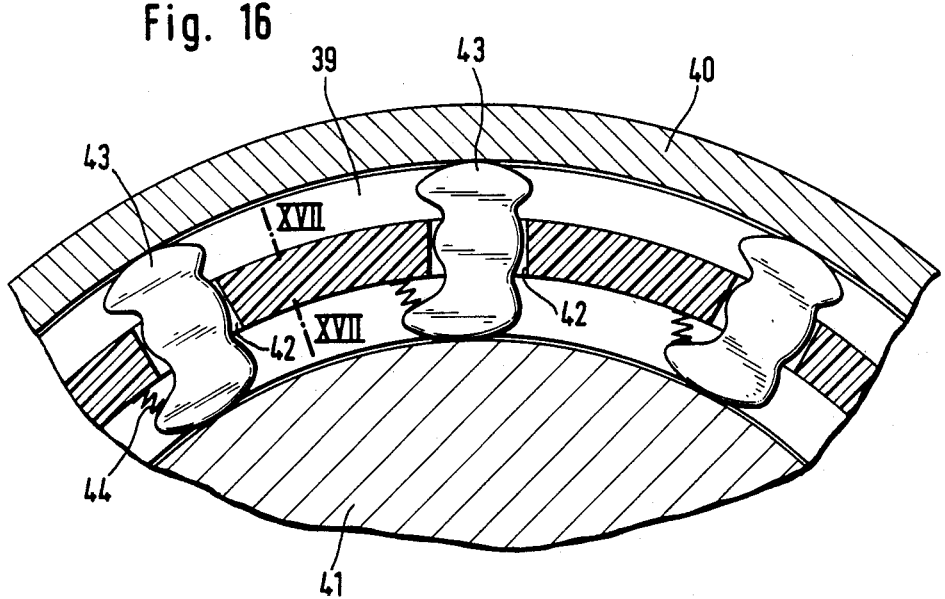
Figure 17:
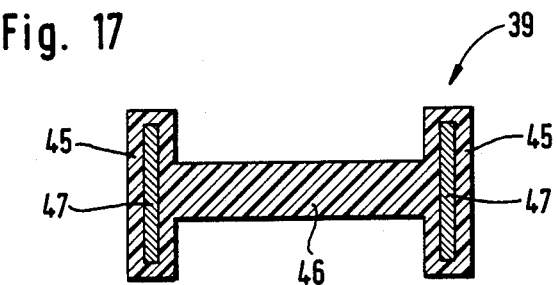

Referring now to the drawings:

FIG. 1 is a perspective view of a cross-section of a cage of the invention,

FIG. 2 is a partial cross-section view of an overrrunning clutch with a cam roller assembly provided with a cage of the invention, FIG. 3 is a partial cross-section view of the cage of the invention taken along the line III—III of FIG. 4 and FIGS. 4 and 5 are partial longitudinal cross-sections taken along the lines IV—IV and V—V of FIG. 3, FIG. 6 is a partial cross section view of the cage of the invention taken along the line VI—VI of FIG. 7 and FIGS. 7 and 8 are partial longitudinal cross-sections taken along the lines VII—VII and VIII—VIII of FIG. 6, FIG. 9 is a partial cross-section view of the cage of the invention taken along the line IX—IX of FIG. 10 an FIGS. 10 and 11 are partial longitudinal cross-sections taken along the lines X—X and XI—XI of FIG. 9, FIG. 12 is a partial cross-section view of the cage of the invention taken along the line XII—XII of FIG. 13 and FIGS. 13 and 14 are partial longitudinal cross-sections taken along the lines XIII—XIII and XIV—XIV of FIG. 12, FIG. 15 is detail A of FIG. 12 on an enlarged scale, FIG. 16 is a partial cross-section view of an overrunning clutch cam element assembly provided with a cage of the invention and FIG. 17 is a partial longitudinal cross-section taken along the line XVII—XVII of FIG. 16.

FIG. 1 shows a cage 1 of the invention for an overrunning clutch cam roller assembly made of polymeric material. For retaining not-shown cam rollers, the cage 1 has pockets 2 which are defined by crossbars 3 and end rings 4 connected to the latter. As can be seen from FIG. 2, the overrunning clutch cam roller assembly utilizing the cage 1 has an outer race 5 provided with camming ramps 6 which are engaged by cam rollers 7 under the action of springs 8. Moreover, the cam rollers 7 abut against the cylindrical external surface of an inner element 9 which extends through the bore of the cage 1 and is connectable with the outer race 5 in a non-rotational manner in one direction of rotation while being freely rotatable in the other direction of rotation. The cage 1 is centered by its outer circumference in the bore of the outer race 5 while receiving the inner element 9 in its bore which acts as a sliding bearing.

At the outer periphery of its end rings 4, the cage 1 is provided with projections 10 which as shown in FIG. 2 are provided with slant surfaces 11 abutting against correspondingly inclined surfaces 12 of the outer race 5 opposite to the camming ramp 6 for preventing rotation of the cage 1 in the overrunning direction. The projections 10 are dimensioned so that the cage 1 can be axially inserted into the outer race 5 when occupying the angular position relative to the outer race 5 as shown in FIG. 2 which position corresponds to an operation during overrunning. The cage 1 is then retained in this position by the springs 8.

As shown in FIGS. 3 to 5. the cage 1 is provided in the area of its end rings 4 with a respective disc-shaped sheet metal element 13 which through injection-molding is connected with the cage 1 in a form-fitting manner. The sheet metal elements 13 have a radial extension corresponding essentially to that of the end rings 4 and are defined by a temperature expansion coefficient which corresponds essentially to that of the outer race 5 and the inner part 9. The sheet metal elements 13 are integrally provided at their outer periphery with radially directed lugs 14 by which they extend into the one area of the projections which includes the slant surface 11. The lugs 14 are designed so that they have a boundary edge which corresponds to the slant surface 11 and are not covered by polymeric material. Through this measure, the projections 10 can resist greater loads and are simultaneously protected from wear as the lugs 14 abut against surfaces of the outer race which are inclined in correspondence to the slant surface 11, and thus the transfer of forces results between metallic parts.

A further cage 15 of the invention is illustrated in FIGS. 6 to 8 and includes end rings 18 connected with crossbars 17 to provide pockets 16 for not shown cam rollers. The cage 15 is shielded by a sheet metal element which is made in the form of a rolling-contact bearing cage of sheet metal and includes sleeve-shaped sections 19 snapped into the end rings 18 which are connected to each other by prolongations 20 extending axially in the crossbars 17. The sheet metal element is accommodated in the bore of the cage 15 in a corresponding recess 21 which has a depth slightly greater than the thickness of the sheet metal element so that contact thereof with the inner part is avoided. Through the projecting areas of the polymeric material, a lubricating reservoir is defined.

In FIGS. 9 to 11, a cage 22 of the invention is shown which also includes end rings 23 connected by crossbars 25 to define pockets 24 for not shown cam rollers and corresponds in its dimensions essentially to the previously described ones. Also in case of cage 22, the sheet metal element is designed in the form of a rolling-contact bearing cage which is made of sheet metal with U-shaped cross-section so that the sheet metal is provided in the area of the end rings 23 with two flanges 26 which are connected to each other by axially directed prolongations 27 extending in the crossbars 25. The end rings 23 of the cage 22 have such enlarged bores 28 that an engagement with the inner element is prevented. Instead, the crossbars 25 project radially inwardly with their segmental areas 29 over the bores 28 of the end rings 23 so that the areas 29 define with the inner element a multi-surface sliding bearing.

Finally, FIGS. 12 to 15 illustrate a cage 30 of the invention having end rings 33 which are connected to each other by crossbars 31 to define pockets 32 for not shown cam rollers and in which the flanges 34 of a sheet metal element of U-shaped cross-section made in the form of a rolling-contact bearing cage of sheet metal are arranged and connected to each other by prolongations 35 extending in the crossbars 31. In the cage 30, the bore wall which is in engagement with the inner element is defined by radially inwardly directed surfaces of the sheet metal which exceeds the polymeric material by a portion of the sheet metal thickness. As is illustrated in FIG. 15, the sheet metal element is provided at its surfaces engaging the inner element with a layer 36 of a sliding bearing material to improve the sliding and wear behavior between the sheet metal and the inner element.

Moreover, the flanges 34 of the sheet metal element extend to the outer diameter of the end rings 33 and are free of polymeric material at their outer periphery. The cage 30 can thus be centered in the bore of the outer race by the flanges 34 of the sheet metal element. In contrast to the previously described embodiments, the flanges 34 of the sheet metal element include extensions 37 at their outer periphery which are provided with slant surfaces 38 for abutting corresponding surfaces of the outer race. Like the previously described projections 10, the extensions 37 are designed so that the cage 30 can be inserted axially into the outer race when in the operating state corresponding to the angular position relative to the outer race.

FIGS. 16 and 17 show the use of the cage of the invention in connection with an overrunning clutch cam element assembly. The cage 39 is floatingly arranged between the outer race 40 and the inner element 41 and accommodates in pockets 42 non-circular cam elements 43 which are retained by springs 44 in camming contact with the cylindrical surfaces of the elements 40 and 41. FIG. 17 illustrates that in both end rings 45 of the cage 39 which are connected by crossbars 46, disc-shaped sheet metal elements 47 are provided which through injection-molding are connected in a form-fitting manner with the cage 39. The only difference between the embodiment as illustrated in FIGS. 16 and 17, on the one hand, and the previously described embodiments, on the other hand, resides in the floating arrangement of the cage between the outer race 40 and the inner element 41 so as to be in sliding contact with the cylindrical surfaces of both these parts while in the previously described embodiments, the cage is received in non-rotational manner in the outer race and is in sliding contact only with the inner element.

Although the exemplified embodiments illustrate solely window cages, it is certainly possible to design the cage of the invention also as comb cages. Various other modifications of the cages of the invention may be made without departing from the spirit or scope thereof. It should be understood that the invention is intended to be limited only as defined in the appended claims.

What we claim is:

1. A cage for an overrunning clutch with a metallic outer race, accommodating concentrically a metallic inner element and having arranged between the outer race and the inner element camming elements retained under the action of springs in camming contact with the surfaces of the outer race, on the one hand, and of the inner element, on the other hand, the said cage being made of injection moldable and castable polymeric material and having pockets for the camming elements defined by crossbars and at least one end ring connected therewith and whereby the cage is provided at least in the area of the end ring with an annular metallic shield connected to the cage in a forming-fitting manner especially through injection-molding, characterized in that the temperature expansion coefficient of the metallic shield corresponds essentially to that of the outer race (5,40) and the inner element (9,41), whereby the shield is formed from a disc-shaped sheet metal element (13,26,34,47), whose radial extension corresponds essentially to the radial extension of the end ring (4,23,33,45).

2. The cage of claim 1 wherein the camming elements are cylindrical cam rollers (7) which cooperate, on the one hand, with camming ramps (6) in the bore of the outer race (5) and, on the other hand, with the cylindrical surface of the inner element (9).

3. The cage of claim 1 wherein the metallic shield (19,26,34) has essentially axially directed projections (20,27,35) extending into the crossbars (17,25,31).

4. The cage of claim 1 wherein the cage (22) is provided in the area of the crossbars (25) with radially inwardly projecting segments (29) made of polymeric material whose radially inwardly directed surfaces define a multi-surface sliding bearing for the inner element.

5. The cage of claim 1 wherein the metallic shield (34) extends to the outer surface of the cage (30) while being free from polymeric material at its outer periphery and the cage (30) is centered in the outer race by the outer periphery of the metallic shield (34).

6. The cage of claim 1 wherein at least one radially outwardly directed projection engages a corresponding recess of the outer race for providing a security against rotation and the metallic shield (13,26,34) extends into the projection and is free of polymeric material at the contact surface of the projection with the recess.

7. The cage of claim 6 wherein the projection is defined by an extension (37) of the metallic shield (34).

8. The cage of claim 1 wherein the cage accommodates noncircular cam elements (43) which cooperate with the cylindrical bore of the outer race (40), on the one hand, and with the cylindrical surface of the inner element (41) on the other hand.

9. A cage for an overrunning clutch with a metallic outer race accommodating concentrically a metallic inner element and having arranged between the outer race and the inner element camming elements retained under the action of springs in camming contact with the surfaces of the outer race, on the one hand, and of the inner element, on the other hand, the said cage being made of injection moldable and castable polymeric material and having a bore and pockets for the camming elements defined by crossbars and at least one end ring connected therewith and whereby the cage is provided at least in the area of the end ring with an annular metallic shield connected to the cage in a forming-fitting manner especially through injection-molding, characterized in that the temperature expansion coefficient of the metallic shield corresponds essentially to that of the outer race (5,40) and the inner element (9,41), whereby the shield is formed from a sleeve-shaped sheet metal element (19) arranged in the area of the end ring (18) which is accommodated in a corresponding recess (21) in the bore of the cage (15).

10. The cage of claim 9 wherein the sheet metal element projects in the area of the bore of the cage (30) radially inwardly by at least a portion of its thickness relative to the polymeric material.

11. The cage of claim 10 wherein the sheet metal element has a bore wall which is provided with a layer (36) of a plain bearing material.

* * * * *